United States Patent
Ando et al.

(10) Patent No.: US 11,430,990 B2
(45) Date of Patent: Aug. 30, 2022

(54) POSITIVE ELECTRODE ACTIVE MATERIAL FOR NONAQUEOUS ELECTROLYTE SECONDARY BATTERY, METHOD FOR PRODUCING SAME, AND NONAQUEOUS ELECTROLYTE SECONDARY BATTERY

(71) Applicant: SUMITOMO METAL MINING CO., LTD., Tokyo (JP)

(72) Inventors: Takaaki Ando, Niihama (JP); Haruki Kaneda, Niihama (JP); Jun Suzuki, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 167 days.

(21) Appl. No.: 16/320,730

(22) PCT Filed: Jul. 28, 2017

(86) PCT No.: PCT/JP2017/027537
§ 371 (c)(1),
(2) Date: Apr. 17, 2019

(87) PCT Pub. No.: WO2018/021554
PCT Pub. Date: Feb. 1, 2018

(65) Prior Publication Data
US 2019/0252680 A1   Aug. 15, 2019

(30) Foreign Application Priority Data
Jul. 29, 2016   (JP) .............................. JP2016-150621

(51) Int. Cl.
*H01M 4/00* (2006.01)
*H01M 4/525* (2010.01)
(Continued)

(52) U.S. Cl.
CPC ............ *H01M 4/525* (2013.01); *C01G 53/00* (2013.01); *C01G 53/50* (2013.01); *H01M 4/505* (2013.01);
(Continued)

(58) Field of Classification Search
CPC ................. H01M 4/525; H01M 4/505; H01M 2004/028; H01M 10/052; C01G 53/50;
(Continued)

(56) References Cited

U.S. PATENT DOCUMENTS

2006/0093920 A1*   5/2006   Cheon .................. H01M 4/131
429/232
2014/0175329 A1*   6/2014   De Palma ............. H01M 4/505
252/182.1
(Continued)

FOREIGN PATENT DOCUMENTS

JP   2010-080394 A   4/2010
JP   2011-116580 A   6/2011
(Continued)

OTHER PUBLICATIONS

Office Action dated Jun. 23, 2020, issued in counterpart JP Application No. 2016-150621, with English Translation. (7 pages).
(Continued)

*Primary Examiner* — Nicholas P D'Aniello
(74) *Attorney, Agent, or Firm* — WHDA, LLP

(57) ABSTRACT

Provided are a positive electrode active material with which a secondary battery having high charging and discharging capacities and an excellent cycle characteristic can be obtained, and a method for producing the same. A positive electrode active material for a nonaqueous electrolyte secondary battery includes a lithium-metal composite oxide represented by a general formula: $Li_aNi_xCo_yMn_zM_tO_{2+\alpha}$ and containing a secondary particle formed of a plurality of
(Continued)

flocculated primary particles. A void ratio obtained from an image analysis result of a cross section of the secondary particle, the image thereof being obtained by a scanning electron microscope, is at least 5% and up to 50% in a first area that is from a central part of the secondary particle to one half of a radius of the secondary particle, and is up to 1.5% in a second area that is outside the first area.

9 Claims, 6 Drawing Sheets

(51) Int. Cl.
    *C01G 53/00*      (2006.01)
    *H01M 4/505*      (2010.01)
    *H01M 4/02*      (2006.01)

(52) U.S. Cl.
    CPC ...... *C01P 2004/03* (2013.01); *C01P 2004/51* (2013.01); *C01P 2004/61* (2013.01); *C01P 2006/11* (2013.01); *H01M 2004/028* (2013.01)

(58) Field of Classification Search
    CPC ..... C01G 53/00; C01G 53/44; C01P 2004/51; C01P 2004/03; C01P 2004/61; C01P 2006/11; C01P 2004/50; Y02E 60/10
    See application file for complete search history.

(56) References Cited

U.S. PATENT DOCUMENTS

| | | | |
|---|---|---|---|
| 2014/0186710 A1* | 7/2014 | Ryoshi | H01M 4/525 |
| | | | 429/223 |
| 2016/0013471 A1 | 1/2016 | Kaseda et al. | |
| 2016/0036041 A1 | 2/2016 | Uwai et al. | |
| 2016/0254536 A1* | 9/2016 | Hiratsuka | H01M 4/366 |
| | | | 429/223 |
| 2017/0012288 A1 | 1/2017 | Yamaji et al. | |
| 2017/0271653 A1 | 9/2017 | Yamauchi et al. | |
| 2017/0338485 A1 | 11/2017 | Toya et al. | |
| 2018/0205080 A1 | 7/2018 | Toya et al. | |
| 2018/0331358 A1 | 11/2018 | Yamaji et al. | |

FOREIGN PATENT DOCUMENTS

| | | |
|---|---|---|
| JP | 2015-072801 A | 4/2015 |
| JP | 2016-100060 A | 5/2016 |
| WO | 2014/133063 A1 | 9/2014 |
| WO | 2014/142279 A1 | 9/2014 |
| WO | 2015115547 A1 | 8/2015 |
| WO | 2015/198711 A1 | 12/2015 |

OTHER PUBLICATIONS

International Search Report dated Sep. 12, 2017, issued in counterpart Application No. PCT/JP2017/027537, with English translation (4 pages).

International Preliminary Report on Patentability (Form PCT/IB/373) issued in counterpart International Application No. PCT/JP2017/027537 dated Jan. 29, 2019, with Form PCT/ISA/237, with English translation (12 pages).

\* cited by examiner

POSITIVE ELECTRODE ACTIVE MATERIAL FOR NONAQUEOUS ELECTROLYTE SECONDARY BATTERY, METHOD FOR PRODUCING SAME, AND NONAQUEOUS ELECTROLYTE SECONDARY BATTERY

TECHNICAL FIELD

The present invention relates to a positive electrode active material for a nonaqueous electrolyte secondary battery and a method for producing the same, as well as a nonaqueous electrolyte secondary battery.

BACKGROUND ART

With the recent wide spreading use of portable devices such as a mobile phone and a notebook personal computer, there has been a strong demand to develop a small and light secondary battery having a high energy density. Also, corresponding to the increase in an environmental consciousness, development of an eco-friendly car called XEV which emits less $CO_2$ is progressing. As the characteristics required in the secondary battery for the eco-friendly car, an increase in the running distance per one charge and an excellent cycle characteristic upon repeat of charging and discharging operations may be cited. Accordingly, the secondary batteries to be used in these uses are required to have a further high energy density as well as an excellent cycle characteristic.

As the secondary battery having a high energy density, a nonaqueous electrolyte secondary battery may be cited. As a representative battery of the nonaqueous electrolyte secondary battery, a lithium ion secondary battery may be cited. In a positive electrode material of the lithium ion secondary battery, a lithium-metal composite oxide is used as a positive electrode active material. A lithium-cobalt composite oxide ($LiCoO_2$) can be synthesized comparatively easily, and in addition, the lithium ion secondary battery using the lithium-cobalt composite oxide as the positive electrode active material can generate a high voltage of a 4-V class, so that the lithium-cobalt composite oxide has been put in practical use as the positive electrode active material which can realize the secondary battery having a high energy density.

However, because cobalt is rare and expensive, oxides using nickel, which is cheaper than cobalt, such as a lithium-nickel composite oxide ($LiNiO_2$) and a lithium-nickel-cobalt-manganese composite oxide ($LiNi_{0.33}Co_{0.33}Mn_{0.33}O_2$), have been developed. Among them, the lithium-nickel-cobalt-manganese composite oxide has drawn attention because it is comparatively cheap and has an excellent balance among heat stability, durability, and so forth. However, further enhancement of the energy density and improvement in the cycle characteristic are demanded.

Corresponding to the demands of improvement in the energy density and cycle characteristic in the positive electrode active material, various proposals have been made. In order to improve the cycle characteristic and to realize a high output, for example, Patent Literature 1 proposes the positive electrode active material for a nonaqueous electrolyte secondary battery, the average particle diameter thereof being in the range of 2 to 8 μm, and [(D90-D10)/average particle diameter] that is an indicator to represent a spread of the particle size distribution thereof being up to 0.60. It is considered that the active material like this has a high capacity and a long durability because this material undergoes an electrochemical reaction uniformly.

Patent Literature 2 proposes the positive electrode active material for a nonaqueous electrolyte secondary battery; the material containing secondary particles formed of flocculated primary particles of the lithium-nickel composite oxide; the primary particle having on the surface thereof a coat layer of an inorganic lithium compound or the secondary particle having a void inside thereof; and a ratio of an area occupied by the coat layer or by the void to a cross section area of the secondary particle being in the range of 2.5% to 9%. It is considered that by using the positive electrode active material like this, the secondary battery having high initial charging and discharging capacities as well as an excellent cycle durability can be obtained.

CITATION LIST

Patent Literatures

[Patent Literature 1] Japanese Unexamined Patent Application Publication No. 2011-116580
[Patent Literature 2] Japanese Unexamined Patent Application Publication No. 2010-080394

SUMMARY OF INVENTION

Technical Problems

However, in the positive electrode active material of Patent Literature 1, because the fillability of the positive electrode active material is low, it cannot be said that the volume-based energy density thereof is high. On the other hand, in the positive electrode active material of Patent Literature 2, because the voids are formed in entire of the secondary particle, these voids act as a resistance, thereby resulting in an increase in the reaction resistance of the battery and a decrease in the charging and discharging capacities. In addition, this active material has the coat layer of an inorganic lithium compound on the surface of the primary particle thereby causing an increase in the reaction resistance of the secondary battery to be obtained.

The present invention was made in view of the problems described above. Therefore, provided by the present invention are: a positive electrode active material with which a nonaqueous electrolyte secondary battery having high charging and discharging capacities as well as suppressed deterioration of the charging and discharging capacities even upon repeating the charging and discharging operations can be obtained; and a nonaqueous electrolyte secondary battery containing the positive electrode active material in the positive electrode thereof.

In addition, the present invention has an object to provide a cheap and convenient production method of the above-mentioned positive electrode active material for a nonaqueous electrolyte secondary battery even in an industrial scale.

Solution to Problems

The inventors of the present invention intensively studied improvement in the charging and discharging capacities of the nonaqueous electrolyte secondary battery as well as the cycle characteristic thereof and have found out that the charging and discharging capacities and the cycle characteristic can be improved when the positive electrode active material has a specific particle structure. In addition, they have found out that the particle structure of the positive electrode active material is significantly dependent on production conditions of a composite hydroxide, which is a precursor thereto, and that the particle structure of the positive electrode active material can be controlled when the composite hydroxide obtained under a specific crystallization condition is used in the production of the positive electrode active material. With these findings, the present invention has been completed.

A first aspect of the present invention provides a positive electrode active material for a nonaqueous electrolyte secondary battery, in which the material includes a lithium-metal composite oxide represented by a general formula: $Li_aNi_xCo_yMn_zM_tO_{2+\alpha}$ ($0.95 \le a \le 1.50$, $0.30 \le x \le 0.70$, $0.10 \le y \le 0.35$, $0.20 \le z \le 0.40$, $0 \le t \le 0.1$, $x+y+z+t=1$, and $0 \le \alpha \le 0.5$; and M is at least one element selected from Ti, V, Cr, Zr, Nb, Mo, Hf, Ta, Fe, and W) and containing a secondary particle formed of a plurality of flocculated primary particles. A void ratio obtained from an image analysis result of a cross section of the secondary particle, the image thereof being obtained by a scanning electron microscope, is at least 5% and up to 50% in a first area that is from a central part of the secondary particle to one half of a radius of the secondary particle, and is up to 1.5% in a second area that is outside the first area.

In the positive electrode active material, the void ratio in the first area is preferably at least 5% and up to 20%. In addition, in the positive electrode active material, a tap density is preferably at least 2.0 g/cm$^3$ and up to 2.6 g/cm$^3$. In addition, in the positive electrode active material, a volume-average particle diameter MV is preferably at least 5 μm and up to 20 μm, and [(D90-D10)/average particle diameter] that is an indicator to represent a spread of particle size distribution, is preferably at least 0.7.

A second aspect of the present invention provides a nonaqueous electrolyte secondary battery including a positive electrode including the positive electrode active material for a nonaqueous electrolyte secondary battery as described above.

A third aspect of the present invention provides a method for producing a positive electrode active material for a nonaqueous electrolyte secondary battery, in which the material is represented by a general formula: $Li_aNi_xCo_yMn_zM_tO_{2+\alpha}$ ($0.95 \le a \le 1.50$, $0.30 \le x \le 0.70$, $0.10 \le y \le 0.35$, $0.20 \le z \le 0.40$, $0 \le t \le 0.1$, $x+y+z+t=1$, and $0 \le \alpha \le 0.5$; and M is at least one element selected from Ti, V, Cr, Zr, Nb, Mo, Hf, Ta, Fe, and W) and containing a secondary particle formed of a plurality of flocculated primary particles; and the method includes a crystallization process of crystallizing a nickel-cobalt-manganese composite hydroxide by neutralizing a salt containing at least nickel, a salt containing at least cobalt, and a salt containing at least manganese in an aqueous reaction solution, and a firing process of firing a lithium mixture obtained by mixing the nickel-cobalt-manganese composite hydroxide with a lithium compound in an oxygen atmosphere to obtain a lithium-metal composite oxide; and in the crystallization process, an oxygen concentration in an atmosphere above a solution surface of the aqueous reaction solution is controlled in a range of at least 0.2% by volume and up to 2% by volume, a temperature of the aqueous reaction solution is controlled in a range of at least 38° C. and up to 45° C., the pH value of the aqueous reaction solution is controlled in a range of at least 11.0 and up to 12.5 based on the solution temperature of 25° C., and a dissolved nickel concentration in the aqueous reaction solution is controlled in a range of at least 300 mg/L and up to 900 mg/L.

It is preferable that the crystallization process include continuously adding a mixed aqueous solution including nickel, cobalt, and manganese into a reaction vessel, and overflowing slurry including nickel-manganese composite hydroxide particles formed by neutralization to recover the particles. In addition, in the crystallization process, it is preferable that concentration of the mixed aqueous solution range from at least 1.5 mol/L and up to 2.5 mol/L. In the firing process, it is preferable that firing be carried out at a temperature of at least 800° C. and up to 1000° C. In addition, in the firing process, it is preferable that lithium hydroxide, lithium carbonate, or a mixture of these is used as the lithium compound.

Advantageous Effects of the Invention

By using the positive electrode active material for a nonaqueous electrolyte secondary battery of the present invention, a nonaqueous electrolyte secondary battery having high charging and discharging capacities as well as an excellent cycle characteristic can be obtained. In addition, the production method of the positive electrode active material can be easily carried out even in an industrial scale, so that an industrial value thereof is very high.

DESCRIPTION OF EMBODIMENTS

Figure 1:
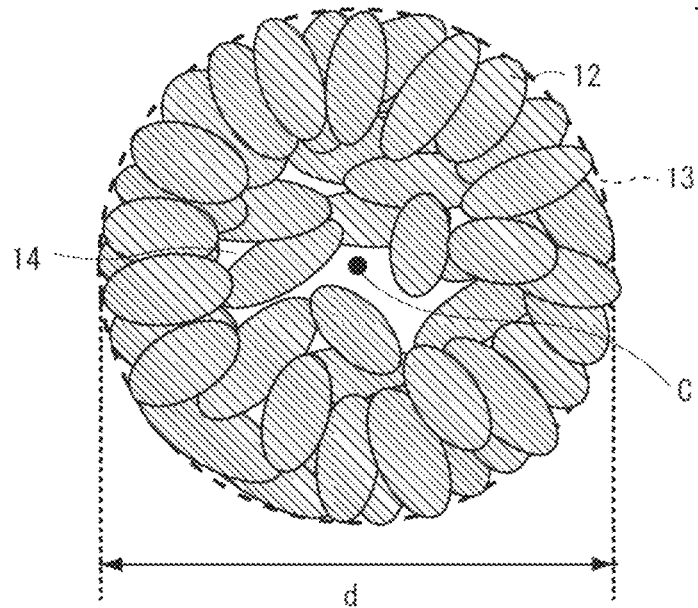
FIG. 1(A) is a schematic diagram illustrating one example of the positive electrode active material for a nonaqueous electrolyte secondary battery according to the present embodiment.
FIG. 1(B) is a diagram explaining the area inside the positive electrode active material for a nonaqueous electrolyte secondary battery.
Figure 1:
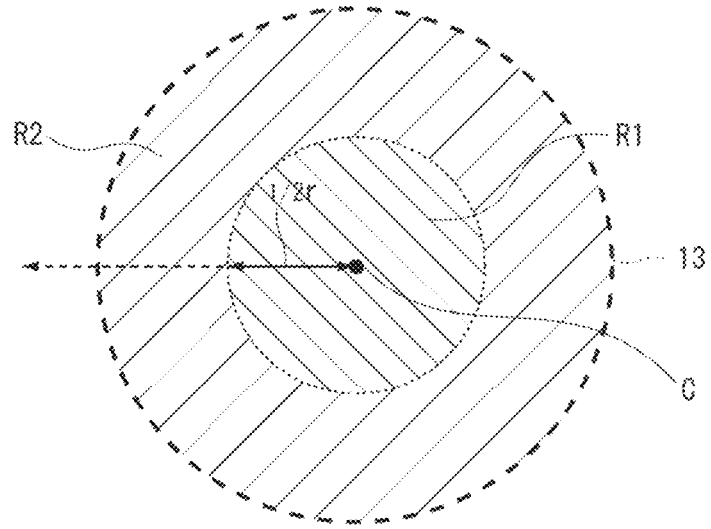

Hereinafter, one example with regard to each of the positive electrode active material for a nonaqueous electrolyte secondary battery, the production method thereof, and so forth according to the present embodiment will be explained with referring to the drawings. It should be note that in order to promote understanding of each component more easily, the drawings are expressed while emphasizing or omitting some parts thereof; and thus, the structure, shape, drawing scale, or the like may be different from those of the actual ones. In addition, the present embodiment to be explained hereinafter does not intend to incorrectly limit the content of the present invention described in the claims; and all of the components explained in the present invention are not necessarily essential as the means to solve the present invention.

(1) Positive Electrode Active Material for a Nonaqueous Electrolyte Secondary Battery FIG. 1(A) is a schematic diagram illustrating one example of the lithium-metal composite oxide 11 that constitutes the positive electrode active material 10 for a nonaqueous electrolyte secondary battery of the present invention (hereinafter, this is also referred to as "positive electrode active material 10"), and FIG. 1(B) is a diagram to explain the area inside the positive electrode active material 10. As illustrated in FIG. 1(A), the lithium-metal composite oxide 11 contains the secondary particle 13 formed of a plurality of flocculated primary particles 12. In addition, the secondary particle 13 has the void 14 among the primary particles 12. Furthermore, the lithium-metal composite oxide 11 mainly contains the secondary particle 13 formed of a plurality of flocculated primary particles 12; however, this may include a small amount of the independent primary particle 12 such as, for example, the primary particle 12 that is not flocculated as the secondary particle 13 and the primary particle 12 that is dropped off from the secondary particle 13 after being flocculated.

In the positive electrode active material 10 including the lithium-metal composite oxide 11 containing the secondary particle 13 formed of a plurality of flocculated primary particles 12, the particle structure thereof, especially the void ratio thereof, has a significant effect to the characteristics of the nonaqueous electrolyte secondary battery (hereinafter, this is also referred to as "secondary battery) upon using this material in the secondary battery. As illustrated in FIG. 1(B), when the void ratio in the inner area that is from the central part C of the secondary particle 13 to one half of the radius r of the secondary particle 13 (first area R1) was made within a specific range, and the void ratio in the area outside this area (second area R2) was made within a specific range that is lower than the void ratio in the first area R1, the inventors of the present invention found that upon using this positive electrode active material 10 in the secondary battery, a retention rate of the battery capacity upon repeat of the charging and discharging operations (hereinafter, this retention rate is also referred to as "cycle characteristic") was able to be increased without decreasing the charging and discharging capacities of the secondary battery (hereinafter, this is also referred to as "battery capacity"). On the basis of this finding, the present invention has been completed. The reason why the cycle characteristic can be improved is not particularly limited; however, it is presumed that, for example, when the positive electrode active materials having different void ratios in each area of the secondary particle 13 are used, cracking of the secondary particle 13 upon repeat of the charging and discharging operations can be suppressed thereby leading to a decrease in deterioration of the battery capacity due to the cracking of the secondary particle 13.

In the positive electrode active material 10, the void ratio in the first area R1 (hereinafter, this is also referred to as "inner area R1") is at least 5.0% and up to 50%. Here, the inner area R1 is the area from the central part C of the cross section of the secondary particle 13 to one half of the radius r of the secondary particle 13; and thus, for example, when the center of gravity of the cross sectional shape formed of the outer circumference of the secondary particle 13 is regarded as the central part C and the shortest distance from the central part C to an arbitrary point on the outer circumference of the secondary particle 13 is regarded as the radius r, the inner area R1 is the area from the central part to one half of the radius (see, FIG. 1(B)). When the void ratio in the inner area R1 is within the range described above, the cycle characteristic of the secondary battery using the positive electrode active material 10 enhances. When the void ratio in the inner area R1 is less than 5.0%, the stress load due to expansion and shrinkage of the particle caused by charging and discharging cannot be relaxed; and thus, cracking of the secondary particle 13 upon repeat of the charging and discharging operation cannot be reduced, thereby resulting in deterioration of the cycle characteristic. On the other hand, when the void ratio in the inner area R1 is more than 50%, because the density of the secondary particle 13 decreases, the packing density into a battery vessel becomes insufficient; and thus, the energy density per battery volume is prone to decrease. In view of increasing the energy density furthermore, the void ratio in the inner area R1 is preferably up to 20%.

In the positive electrode active material 10, the void ratio in the second area R2 (hereinafter, this is also referred to as "outer area R2") is up to 1.5%. Here, the outer area R2 is the area outside the inner area R1 in the secondary particle 13, namely the whole area other than the inner area R1 in the secondary particle 13 (see, FIG. 1(B)). When the void ratio of the outer area R2 is within the range described above, the density of the secondary particle 13 is increased so that the energy density is increased, and the strength of the secondary particle 13 is enhanced so that the cracking of the secondary particle 13 is suppressed. In view of increasing the energy density furthermore, the void ratio in the outer area R2 is preferably up to 1.0%. Here, the lower limit of the void ratio in the outer area R2 is, for example, at least 0.05%, and preferably at least 0.1%.

When the void ratios of the inner area R1 and of the outer area R2 are brought into within the respective ranges as described above, the positive electrode active material 10 can have a high energy density, and also can efficiently relax the stress load caused by expansion and shrinkage upon charging and discharging. Therefore, the secondary battery using this material can have a high battery capacity as well as an excellent cycle characteristic.

Here, the void ratios inside the positive electrode active material 10 (inner area R1 and outer area R2) can be obtained by analyzing the picture (SEM picture) that is obtained by a scanning electron microscope (SEM). For example, the positive electrode active material 10 (secondary particle 13) is buried into a resin or the like, and then, the SEM picture is taken under the state capable of observing the cross section of the secondary particle 13 after it is subjected to a cross section polisher treatment or the like; and next, by using an image analysis software such as WinRoof 6.1.1 (trade name), the void is detected as a black portion, and thus, the void ratio can be obtained as the value expressed with [(area of void 14 in each area of the secondary particle 13/cross section area in each area of the secondary particle 13)×100] (%). For example, in the case of the void ratio in the inner area R1, the void ratio thereof can be obtained from [(area of void 14 in the inner area R1/cross section area in the inner area R1)×100] (%), namely [(area of void 14 in the inner area R1/sum of the cross section area of the primary particle 12 and the void 14 in the inner area R1)×100] (%).

Here, the cross section of the secondary particle 13 to be observed is obtained from 20 secondary particles 13 selected arbitrarily (randomly) as follows. Namely, the selection is made such that in the cross section of a plurality of secondary particles 13, the maximum distance d between two points on the outer circumference of the cross section of one secondary particle 13 (see, FIG. 1(A)) is at least 80% of the volume-average particle diameter (MV) measured using a laser diffraction scattering particle size analyzer.

In the positive electrode active material 10, the tap density is preferably at least 2.0 g/cm$^3$ and up to 2.6 g/cm$^3$, while more preferably at least 2.1 g/cm$^3$ and up to 2.5 g/cm$^3$. When the tap density is within the range described above, the positive electrode active material 10 can be competitive in excellent battery capacity and fillability, and thus, the energy density of the secondary battery can be increased furthermore.

In addition, in the positive electrode active material 10, the volume-average particle diameter MV is preferably at least 5 μm and up to 20 μm, while more preferably at least 6 μm and up to 15 μm. With this, the decrease in the specific surface area can be suppressed while retaining the fillability high; and thus, the secondary battery using this positive electrode active material 10 can be competitive in high packing density and excellent output characteristic.

In addition, in the positive electrode active material 10, [(D90-D10)/average particle diameter] that is an indicator to represent a spread of the particle size distribution thereof, is preferably at least 0.70. When the indicator to represent a spread of the particle size distribution of the nickel-manganese composite hydroxide is within the range described above, fine particles and coarse particles are mixed in a suitable degree; and thus, the fillability of the particle can be enhanced while suppressing deterioration of the cycle characteristic and the output characteristic of the positive electrode active material to be obtained. In view of suppressing excessive mixing of the fine particles or the coarse particles into the positive electrode active material, the indicator to represent a spread of the particle size distribution of the nickel-manganese composite hydroxide is preferably up to 1.2, and more preferably up to 1.0.

In the [(D90-D10)/average particle diameter], D10 means the particle diameter at which the cumulative volume reaches 10% of the total volume of the entire particles, the cumulative volume being obtained by accumulating the particle number in each particle diameter from a side of the small particle diameter; and D90 means the particle diameter at which the cumulative volume reaches 90% of the total volume of the entire particles, the cumulative volume being obtained by similarly accumulating the particle number. The average particle diameter is the volume-average particle diameter MV, which means the volume-weighted average particle diameter. The volume-average particle diameter MV, D90, and D10 can be measured by using a laser diffraction scattering particle size analyzer.

The lithium-metal composite oxide 11 is represented by the general formula: $Li_aNi_xCo_yMn_zM_tO_{2+\alpha}$ ($0.95 \leq a \leq 1.50$, $0.30 \leq x \leq 0.70$, $0.10 \leq y \leq 0.35$, $0.20 \leq z \leq 0.40$, $0 \leq t \leq 0.1$, $x+y+z+t=1$, and 0 a 0.5; and M is at least one element selected from Ti, V, Cr, Zr, Nb, Mo, Hf, Ta, Fe, and W). The lithium-metal composite oxide 11 having the above composition formula has the crystal structure of a layered rock salt structure. Here, the Greek letter α in the general formula is a coefficient that changes with the ratio of the number of Li atoms to the metal elements other than Li included in the lithium-metal composite oxide 11 and with the valencies of the metal elements other than Li.

In the general formula, the alphabetical character x, which indicates the content of nickel, is $0.30 \leq x \leq 0.70$, while preferably $0.30 \leq x \leq 0.60$. Namely, the lithium-metal composite oxide 11 includes nickel as the metal element, in which the content of nickel relative to the total of the metal elements other than lithium is at least 30 atom % and up to 70 atom %, while preferably at least 30 atom % and up to 60 atom %. When the lithium-metal composite oxide 11 has the crystal structure of the layered rock salt structure and the nickel content therein is within the range described above, this can realize a high battery capacity when it is used in the secondary battery.

In the general formula, the alphabetical character y, which indicates the content of cobalt, is $0.10 \leq y \leq 0.35$, while preferably $0.15 \leq y \leq 0.35$. Namely, the content of cobalt relative to the total of the metal elements other than lithium is at least 10 atom % and up to 35 atom %, while preferably at least 15 atom % and up to 35 atom %. When the cobalt content therein is within the range described above, a highly stable crystal structure can be obtained so that an excellent cycle characteristic can be obtained.

In the general formula, the alphabetical character z, which indicates the content of manganese, is $0.20 \leq z \leq 0.40$. Namely, the content of manganese relative to the total of the metal elements other than lithium is at least 20 atom % and up to 40 atom %. When the manganese content therein is within the range described above, a high heat stability can be obtained. When the lithium-metal composite oxide 11 according to the present embodiment has the specific void ratio as mentioned above and contains nickel, cobalt, and manganese, not only further enhanced battery capacity and heat stability can be ensured but also a very good cycle characteristic can be obtained.

Figure 2:
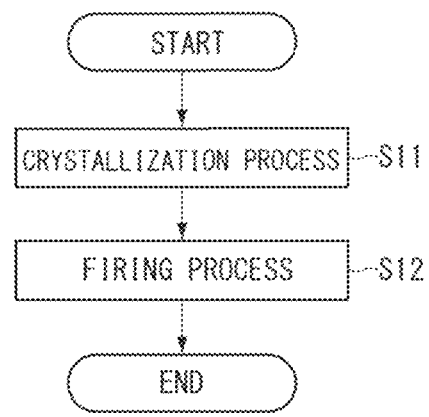
FIG. 2 is a flow diagram (rough diagram) illustrating one example of the method for producing the positive electrode active material for a nonaqueous electrolyte secondary battery according to the present embodiment.
Figure 3:
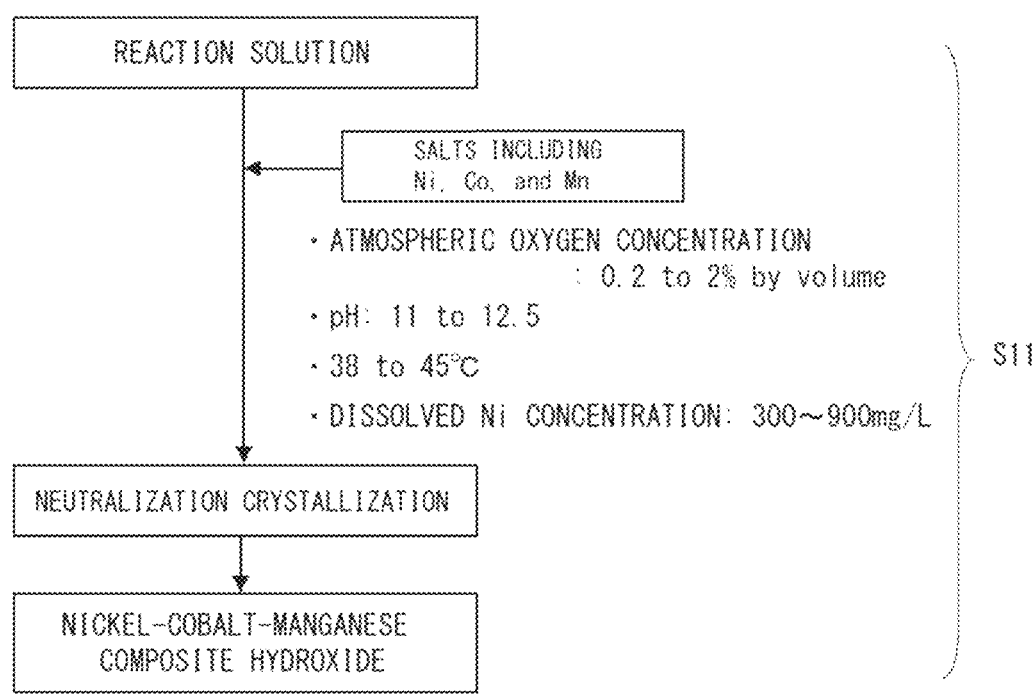
FIG. 3 is a flow diagram illustrating one example of the crystallization process in the method for producing the positive electrode active material for a nonaqueous electrolyte secondary battery according to the present embodiment.

(2) Method for Producing the Positive Electrode Active Material for a Nonaqueous Electrolyte Secondary Battery FIG. 2 is a flow diagram (rough diagram) illustrating one example of the method for producing the positive electrode active material for a nonaqueous electrolyte secondary battery according to one embodiment of the present invention (hereinafter, this material is also referred to as "positive electrode active material"); and FIG. 3 is a diagram illustrating one example of the crystallization process. With the production method of the positive electrode active material of the present embodiment, the positive electrode active material 10 including the lithium-metal composite oxide 11 represented by the general formula: $Li_aNi_xCo_yMn_zM_tO_{2+\alpha}$ ($0.95 \leq a \leq 1.50$, $0.30 \leq x \leq 0.70$, $0.10 \leq y \leq 0.35$, $0.20 \leq z \leq 0.40$, $0 \leq t \leq 0.1$, $x+y+z+t=1$, and $0 \leq \alpha \leq 0.5$; and M is at least one element selected from Ti, V, Cr, Zr, Nb, Mo, Hf, Ta, Fe, and W) and containing the secondary particle 13 formed of a plurality of flocculated primary particles 12 can be conveniently produced in an industrial scale.

The production method of the positive electrode active material of the present embodiment has the crystallization process S11 and the firing process S12, as illustrated in FIG. 2. Hereinafter, each process will be explained in detail. When explaining FIG. 2 and FIG. 3, FIGS. 1(A) and 1(B), which is a schematic diagram illustrating one example of the positive electrode active material, will be referred as appropriate.

[Crystallization Process]

The crystallization process S11 is a process of crystallizing the nickel-cobalt-manganese composite hydroxide (hereinafter, this is also referred to as "composite hydroxide") by neutralizing a salt containing at least nickel, a salt containing at least cobalt, and a salt containing at least manganese in an aqueous reaction solution. In the crystallization process S11, as illustrated in FIG. 3, an atmosphere above a solution surface of the aqueous reaction solution, a temperature of the aqueous reaction solution, the pH value of the aqueous reaction solution based on the solution temperature of 25° C., and a dissolved nickel concentration in the aqueous reaction solution are controlled within respective specific ranges.

The inventors of the present invention carried out an extensive investigation about the production condition of the composite hydroxide to be used as a precursor to the positive electrode active material 10; and as a result, it was found that: 1) in the crystallization process S11, the morphology of the composite hydroxide can be precisely controlled by controlling, in addition to the oxygen concentration in an atmosphere above a solution surface of the aqueous reaction solution (hereinafter, this is also referred to as "atmospheric oxygen concentration"), the dissolved nickel concentration in the aqueous reaction solution and the pH value of the aqueous reaction solution (based on the solution temperature of 25° C.); and 2) because the positive electrode active material 10 finally obtained is strongly influenced by the morphology of the composite hydroxide, the morphology of the positive electrode active material can be optimized by precisely controlling the morphology of the composite hydroxide particle. Here, "morphology" is the character relating to the form and structure of the primary particle and/or secondary particle (composite hydroxide and/or lithium-metal composite oxide 11); here, the character includes the shape, the void ratio, the average particle diameter, the particle size distribution, the tap density, and the like of the particle. Namely, in the production method of the present embodiment, controls of the dissolved nickel concentration in the aqueous reaction solution and of the oxygen concentration in an atmosphere above the solution surface (atmospheric oxygen concentration) are important in the crystallization process S11; and by controlling these factors (parameters), the particle diameter of the secondary particle 13 and the void ratio inside the secondary particle 13 of the positive electrode active material 10 to be finally obtained can be controlled within the respective specific ranges. Hereinafter, these respective conditions in the crystallization process S11 will be explained.

(Oxygen Concentration)

The atmospheric oxygen concentration is appropriately controlled in the range of at least 0.2% by volume and up to 2% by volume. When the atmospheric oxygen concentration is controlled within the range as described above, the morphologies of the primary particle and the secondary particle of the composite hydroxide can be controlled so that the lithium-metal composite oxide 11 having suitable void ratios as the positive electrode active material 10 can be obtained. For example, when the atmospheric oxygen concentration is controlled within the above-mentioned range, the void ratio in the outer area R2 of the positive electrode active material 10 can be increased within the afore-mentioned range in response to increase in the atmospheric oxygen concentration. Namely, the atmospheric oxygen concentration can have a positive relation with the void ratio in the outer area R2; and thus, on the basis of this relation, the void ratio in the outer area R2 can be controlled within the afore-mentioned range.

When the atmospheric oxygen concentration is less than 0.2% by volume, oxidation of transition metals, especially oxidation of manganese hardly takes place; and as a result, inside the secondary particle of the composite hydroxide becomes extremely dense. In addition, it occasionally shows a peculiar shape in the surface thereof. In the positive electrode active material obtained using the composite hydroxide like this, the void ratios of the inner area R1 and of the outer area R2 in the secondary particle are decreased, thereby leading to deterioration of the cycle characteristic as well as increase in the reaction resistance resulting in deterioration of the output characteristic. On the other hand, when the atmospheric oxygen concentration is more than 2% by volume, the secondary particle of the formed composite hydroxide becomes sparse so that the void ratios are increased, and as a result, the void ratio in the outer area R2 of the secondary particle of the positive electrode active material increases thereby leading to deterioration of the cycle characteristic. The atmospheric oxygen concentration can be controlled by introducing gases such as an inert gas (for example, $N_2$ gas and Ar gas), an air, or oxygen into a space inside the reaction vessel while controlling the flow rates of these gases or the composition of the gases. Here, these types of gases may be blown into the aqueous reaction solution as well.

(Dissolved Nickel Concentration)

The dissolved nickel concentration in the aqueous reaction solution is controlled in the range of at least 300 mg/L and up to 900 mg/L, while preferably in the range of at least 300 mg/L and up to 850 mg/L, based on the temperature of the aqueous reaction solution. When the dissolve nickel concentration is appropriately controlled within the range as described above, the particle diameter and particle structure of the positive electrode active material can be controlled by controlling the particle diameter and void ratios of the composite hydroxide. For example, when the dissolved nickel concentration is controlled within the above-mentioned range, in response to the increase in the dissolved nickel concentration, the void ratio in the inner area R1 of the positive electrode active material 10 can be increased within the afore-mentioned range. Namely, the dissolved nickel concentration can have a positive relation with the void ratio in the inner area R1; and thus, on the basis of this relation, the void ratio in the inner area R1 can be controlled within the afore-mentioned range.

When the dissolved nickel concentration in the aqueous reaction solution is less than 300 mg/L, the growth rate of the primary particle of the composite hydroxide is so fast that the nucleation becomes dominant over the particle growth thereby leading to decrease in the size of the primary particle; and thus, this occasionally causes poor sphericity in the secondary particle. When the composite hydroxide like this is fired after it is mixed with lithium, whole of the secondary particle shrinks so that the void ratio in the inner area R1 of the secondary particle decreases. In addition, because of the poor sphericity of the positive electrode active material, a high energy density cannot be obtained when this is used in the battery. On the other hand, when the dissolved nickel concentration is more than 900 mg/L, a generation rate of the secondary particle of the composite hydroxide becomes so slow that this occasionally causes a decrease in the void ratios of the positive electrode active material 10. In addition, occasionally nickel remains in the filtrate thereby causing significant deviation of the composition of the obtained composite hydroxide from the target values thereof. Besides, under the condition of excessively high dissolved nickel concentration, impurities included in the composite hydroxide increases so much that this occasionally causes deterioration of the battery characteristics when the positive electrode active material (lithium-metal composite oxide 11) obtained from the composite hydroxide is used in the battery.

(pH Value)

The pH value of the aqueous reaction solution is in the range of at least 11.0 and up to 12.5, preferably in the range of at least 11.0 and up to 12.3, while more preferably in the range of at least 11.0 and up to 12.0, based on the solution temperature of 25° C. When the pH value is within the range described above, the size and shape of the primary particle of the composite hydroxide can be controlled so as to control the void ratios of the secondary particle; and thus, the morphology of the secondary particle can be properly controlled. Accordingly, the lithium-metal composite oxide 11 that is further suitable as the positive electrode active material 10 can be obtained.

When the pH value is less than 11.0, the generation rate of the composite hydroxide becomes extremely slow so that coarse secondary particles are formed. In addition, occasionally nickel remains in the filtrate thereby causing significant deviation of the composition of the obtained composite hydroxide from the target values thereof. On the other hand, when the pH value is more than 12.5, the particle growth rate is so fast that nucleation can readily takes place thereby leading to the particle with a small particle diameter and a poor sphericity, so that this occasionally causes deterioration of the fillability of the positive electrode active material.

(Reaction Temperature)

The temperature of the aqueous reaction solution in the crystallization reaction vessel is preferably in the range of at least 38° C. and up to 45° C. It is also preferable to control the upper and lower limits of the temperature within 5° C. By so doing, the particle growth of the composite hydroxide can be stabilized, so that the shapes and particle diameters of the primary and secondary particles can be readily controlled.

When the temperature of the aqueous reaction solution is higher than 45° C., priority of the nucleation relative to the particle growth in the aqueous reaction solution rises, so that the shape of the primary particle that constitutes the composite hydroxide is prone to be too fine. On the other hand, when the temperature of the aqueous reaction solution is lower than 38° C., there is a tendency that the particle growth is dominant over the nucleation; and thus, the shapes of the primary and secondary particles that constitute the composite hydroxide are prone to be coarse. When the composite hydroxide having the coarse secondary particle like this is used as the precursor to the positive electrode active material, there is a problem of forming the positive electrode active material containing particles that are so large and coarse thereby likely to generate irregularity in the electrode upon production thereof. In addition, when the temperature of the aqueous reaction solution is lower than 35° C., there is a problem of a very poor reaction efficiency because remaining amounts of the metal ions in the aqueous reaction solution are so high; and moreover, the problem is prone to appear that the composite hydroxide including large amounts of impurity elements is formed.

(Others)

The production method of the present embodiment includes the crystallization process S11 in which the nickel-cobalt-manganese composite hydroxide particle is formed by neutralizing the salts including at least nickel, cobalt, and manganese in the aqueous reaction solution. In the specific embodiment of the crystallization process, for example, the pH value is controlled by neutralization. Here, a neutralizing agent (for example, an alkaline solution) is added to a mixed aqueous solution including at least nickel (Ni), cobalt (Co), and manganese (Mn) in the reaction vessel while stirring the mixed aqueous solution at a constant stirring rate, and thereby the composite hydroxide particle can be formed by co-precipitation.

In the crystallization process S11, the stirring power to be applied to the aqueous reaction solution is not particularly limited so far as the positive electrode active material 10 as described above can be produced; and thus, the stirring power is controlled preferably in the range of at least 2.0 kW/m$^3$ and up to 6.7 kW/m$^3$, while more preferably in the range of at least 3 kW/m$^3$ and up to 6.5 kW/m$^3$. When the stirring power within the range as described above is applied, formation of excessively fine or coarse secondary particles can be suppressed, so that the particle diameter of the composite hydroxide can be made further suitable as the positive electrode active material.

In the production method of the present embodiment, any of a crystallization method based on a batch system and a continuous crystallization method may be employed. Here, the continuous crystallization method is a process in which while continuously feeding the mixed aqueous solution as described above, pH is controlled by feeding the neutralizing agent, and whereby the composite hydroxide particles thus formed is recovered by overflowing. For example, in the crystallization process, the mixed aqueous solution including nickel, cobalt, and manganese is continuously added to the reaction vessel, and then, slurry including the composite hydroxide particles formed by neutralization is overflowed so that the particles can be recovered. In the continuous crystallization method, the particles having a broader particle size distribution as compared with the batch method, for example, the particles having [(D90-D10)/average particle diameter] that is an indicator to represent a spread of the particle size distribution thereof at least 0.7 can be obtained; thus, the particles having a high fillability are prone to be obtained. In addition, the continuous crystallization method is suitable for mass production, so that this is also an industrially advantageous production method. For example, when production of the composite hydroxide of the present embodiment is carried out by the continuous crystallization method, the fillability (tap density) of the composite hydroxide particles to be obtained can be improved furthermore, so that the composite hydroxide having further improved fillability and void ratios can be produced conveniently and massively.

With regard to the mixed aqueous solution, an aqueous solution including at least nickel, cobalt, and manganese, namely, an aqueous solution having at least a nickel salt, a cobalt salt, and a manganese salt dissolved therein may be used. In addition, the mixed aqueous solution may include M; and thus, an aqueous solution having a nickel salt, a manganese salt, and an M-including salt dissolved therein may be used. With regard to the nickel salt, the manganese salt, and the M-including salt, for example, at least one selected from the group consisting of sulfate, nitrate, and chloride may be used. Among them, in view of a cost as well as a waste water treatment, sulfate salts thereof are preferably used.

Concentration of the mixed aqueous solution is preferably in the range of at least 1.0 mol/L and up to 2.5 mol/L, while more preferably in the range of at least 1.5 mol/L and up to 2.5 mol/L, as a total of the metal salts dissolved therein. With this, the particle diameter of the composite hydroxide can be readily controlled in a proper size, so that the fillability of the positive electrode active material to be obtained can be improved. Here, the composition of the metal elements included in the mixed aqueous solution coincides with the composition of the metal elements included in the composite hydroxide to be obtained. Accordingly, the composition of the metal elements in the mixed aqueous solution can be adjusted so as to be the same as the composition of the metal elements of the target composite hydroxide.

Together with the neutralizing agent, a complexing agent may also be added into the mixed aqueous solution. The complexing agent is not particularly limited so far as it can form a complex in an aqueous solution by bonding to metal elements such as a nickel ion, a cobalt ion, and a manganese ion. For example, as the complexing agent, an ammonium-ion-providing body may be cited. The ammonium-ion-providing body is not particularly limited; for example, at least one solution selected from the group consisting of an aqueous ammonium solution, an aqueous ammonium sulfate solution, and an aqueous ammonium chloride solution may be used. Among theme, in view of easy handling, the aqueous ammonium solution is preferably used. In the case when the ammonium-ion-providing body is used, the ammonium ion concentration is preferably made in the range of at least 5 g/L and up to 25 g/L, while more preferably in the range of at least 5 g/L and up to 15 g/L.

By so doing, fluctuation of the particle diameter due to fluctuation of the pH value can be suppressed, so that the particle diameter can be controlled more readily. In addition, the sphericity of the composite hydroxide can be improved furthermore, so that the fillability of the positive electrode active material can be improved.

With regard to the neutralizing agent, an alkaline solution may be used; for example, an aqueous solution of a general alkali metal hydroxide such as sodium hydroxide or potassium hydroxide may be used. Among them, in view of a cost and a handling easiness, the sodium hydroxide aqueous solution is preferably used. Here, the alkali metal hydroxide may be added directly into the aqueous reaction solution; however, in view of easy control of pH, it is added preferably as the aqueous solution thereof. In this case, concentration of the alkali metal hydroxide aqueous solution is preferably in the range of at least 12% by mass and up to 30% by mass, while more preferably in the range of at least 20% by mass and up to 30% by mass. When concentration of the alkali metal hydroxide aqueous solution is less than 12% by mass, the supply amount thereof to the reaction vessel is increased, so that there is a risk of insufficient particle growth. On the other hand, when concentration of the alkali metal hydroxide aqueous solution is more than 30% by mass, the pH value becomes locally high depending on the addition position of the alkali metal hydroxide, so that there is a risk of forming fine particles.

After the crystallization process S11, it is preferable to wash the composite hydroxide. This washing process is a process in which the impurities included in the composite hydroxide obtained in the crystallization process S11 is washed out. It is preferable to use purified water as the washing solution. The amount of the washing solution is preferably at least 1 L relative to 300 g of the composite hydroxide. When the amount of the washing solution relative to 300 g of the composite hydroxide is less than 1 L, washing thereof is insufficient, so that occasionally the impurities are left in the composite hydroxide. The washing may be carried out by pouring the washing solution such as purified water to a filtration machine such as, for example, a filter press. In the case when $SO_4$ that is left in the composite oxide needs to be washed out furthermore, it is preferable to use sodium hydroxide or sodium carbonate as the washing solution.

After washing, drying is carried out preferably in the temperature range of at least 110° C. and up to 150° C. The drying temperature and time may be set approximately in such a level that the moisture included therein can be removed; for example, the time is in the range of at least about 1 hour and up to about 24 hours. In addition, a heat treatment process may be further added in which the composite hydroxide after being dried is heated in the temperature range of at least 350° C. and up to 800° C. so as to convert it to the nickel-cobalt-manganese composite oxide (hereinafter, this is also referred to as "composite oxide"). With this heat treatment, generation of a water vapor is suppressed in the firing process S12, which follows thereafter, so that not only the reaction with a lithium compound can be facilitated but also the ratio of the metal elements other than lithium to lithium in the positive electrode active material 10 can be stabilized.

When the heat treatment temperature in the heat treatment process is lower than 350° C., conversion to the composite oxide is insufficient. On the other hand, when the heat treatment temperature is higher than 800° C., sintering among the composite oxide particles themselves can occasionally take place thereby generating coarse particles. Besides, because much energy is needed, such a high temperature heat treatment is industrially unsuitable. The atmosphere of the heat treatment is not particularly limited, and a non-reducing atmosphere that includes oxygen may be used. The heat treatment is carried out preferably in an air atmosphere in view of convenience.

The heat treatment time is set such that conversion to the composite oxide may be sufficient; therefore, it is preferably the range of 1 to 10 hours. The equipment to be used in the heat treatment is not particularly limited; and thus, the equipment with which the composite hydroxide can be heated in a non-reducing atmosphere that includes oxygen, preferably in an air atmosphere, may be used. For this, the equipment not generating a gas, such as, for example, an electric furnace or the like is suitably used.

[Firing Process]

The firing process S12 is a process of firing the mixture obtained by mixing the composite hydroxide with a lithium compound in an oxygen atmosphere to obtain the lithium-metal composite oxide. The composite hydroxide or the composite oxide obtained by heat treatment of the hydroxide is mixed with the lithium compound such that the ratio (Li/Me) of the number of the lithium atom (Li) to the total number of the atoms of the metal elements other than lithium (Me) will be at least 0.95 and up to 1.50, preferably at least 0.98 and up to 1.15, while more preferably at least 1.01 and up to 1.09. Namely, because the ratio Li/Me does not change before and after the firing process, the mixing ratio of Li/Me in the mixing process is the Li/Me ratio in the positive electrode active material; and thus, the mixing is carried out such that the ratio Li/Me in the mixture may be the same as the Li/Me ratio in the positive electrode active material to be obtained.

When the composite hydroxide (composite oxide) and the lithium compound are mixed such that the Li/Me ratio falls within the range as described above, crystallization is facilitated. When the Li/Me ratio is less than 0.95, part of the oxide does not react with lithium thereby leaving the lithium unreacted so that occasionally a sufficient battery performance cannot be obtained. On the other hand, when the Li/Me ratio is more than 1.50, sintering is facilitated thereby leading to an increase in the particle diameter and the crystallite diameter so that occasionally a sufficient battery performance cannot be obtained.

The lithium compound to be used for forming the lithium mixture is not particularly limited; however, in view of easy availability, for example, lithium hydroxide, lithium nitrate, lithium carbonate, or a mixture of these are preferable. In particular, considering the handling easiness and quality stability thereof, lithium hydroxide, lithium carbonate, or a mixture of these is more preferably used.

Here, it is preferable that the lithium mixture be fully mixed before being fired. When the mixing is not sufficient, the Li/Me ratio fluctuates among particles, so that there are possibilities of insufficient battery characteristics and the like; and thus, they need to be fully mixed before being fired. For mixing, general mixing machines may be used, such as, for example, a shaker mixer, a Lodige mixer, a Julia mixer, and a V blender so far as the composite oxide particles can be sufficiently mixed with the lithium-containing substance to a degree that the shape and structure of the heat-treated particles and the like are not destroyed.

Next, the mixture is fired in an oxygen atmosphere, i.e., in an oxygen-containing atmosphere, to obtain the lithium-metal composite oxide. The firing temperature at this time is made preferably at least 800° C. and up to 1000° C. With this, the crystallinity thereof is enhanced and the displacement is facilitated. When the firing temperature is lower than 800° C., the lithium raw material cannot fully react, so that excess lithium is left, or the crystal cannot be grown sufficiently well thereby occasionally causing deterioration of the battery characteristics. On the other hand, when the firing temperature is higher than 1000° C., sintering and flocculation advance thereby occasionally leading to deterioration of the fillability of the particles and the battery characteristics. In addition, mixing between the Li site and the transition metal site can take place thereby leading to deterioration of the battery characteristics.

The firing time is not particularly limited, and it is in the range of at least about 1 hour and up to about 24 hours. When the firing time is less than 1 hour, the lithium raw material cannot react fully, so that occasionally excess lithium is left, or the crystal cannot be grown sufficiently well thereby leading to deterioration of the battery characteristics. In view of uniformly carrying out the reaction between the lithium compound and the composite hydroxide or the composite oxide obtained by oxidizing the composite hydroxide, the temperature raising rate is preferably, for example, in the range of at least 1° C./minute and up to 10° C./minute until the firing temperature. In addition, before being fired, the mixture may be kept at the temperature around the melting point of the lithium compound for a period of about 1 hour to about 10 hours. By so doing, the reaction can be carried out further uniformly.

Here, the furnace to be used in firing is not particularly limited, so that any furnace may be used so far as the mixture can be heated in an air atmosphere or in an oxygen stream; however, in view of keeping the atmosphere inside the furnace uniformly, an electric furnace not generating a gas is preferable. Here, any of a batch system and a continuous system may be used.

Occasionally, the lithium-metal composite oxide obtained by firing is flocculated or lightly sintered. In this case, the oxide may be crushed; and by so doing, the lithium-metal composite oxide 11, namely, the positive electrode active material 10 according to the present embodiment can be obtained. Here, the term "crushing" means the operation in which a mechanical energy is applied to the flocculate formed of a plurality of secondary particles thereby loosening the flocculate so as to separate the secondary particles without significantly destroying the secondary particle itself, the flocculate being formed by sintering necking or the like among the secondary particles during firing.

(3) Nonaqueous Electrolyte Secondary Battery

The nonaqueous electrolyte secondary battery (hereinafter, this is also referred to as "secondary battery") of the present embodiment includes a positive electrode, a negative electrode, and a nonaqueous electrolyte solution, and composed of the same composition elements as those of a general lithium ion secondary battery. Hereinafter, one example of the secondary battery of the present embodiment will be explained with respect to each composition element separately. It should be noted that the embodiments explained hereinafter are mere examples, so that the secondary battery may be carried out not only with the embodiments described below but with the embodiments changed or modified variously on the basis of a knowledge of a person ordinarily skilled in the art. In addition, the secondary battery is not particularly limited in the use thereof.

(Positive Electrode)

The positive electrode of the nonaqueous electrolyte secondary battery is prepared by using the positive electrode active material 10 as described above. Hereinafter, one example of the production method of the positive electrode will be explained. First, the positive electrode active material 10 (powder form), a conductive agent, and a binder are mixed, and as needed, an activated carbon and a solvent for the purpose of viscosity adjustment and the like are added thereto; and then, they are kneaded to prepare a positive electrode mixed material paste.

The mixing ratios of each material in the positive electrode mixed material serve as a factor to determine the performance of the lithium secondary battery; and thus, the ratios can be adjusted in accordance with the use thereof. The mixing ratios of the materials may be made as same as those of publicly known positive electrodes of the lithium secondary battery; therefore, for example, when total mass of the solid portions in the positive electrode mixed material excluding the solvent is regarded as 100% by mass, the positive electrode active material may be included therein in the range of 60% by mass to 95% by mass, the conductive agent in the range of 1% by mass to 20% by mass, and the binder in the range of 1% by mass to 20% by mass.

The positive electrode mixed material paste thus obtained is applied to the surface of an electric collector made of, for example, aluminum foil, and then it is dried to scatter the solvent to prepare the sheet-like positive electrode. As needed, in order to increase the electrode density, it is also pressed with a roll-press or the like. The sheet-like positive electrode obtained in the way as described above is, for example, cut to a proper size in accordance with the target battery; and then, this can be used for fabrication of the battery. However, the preparation method of the positive electrode is not limited to the above-mentioned example, so that it may also be prepared by other methods.

With regard to the conductive agent, for example, graphite (such as natural graphite, artificial graphite, and expandable graphite) as well as carbon black materials such as acetylene black and Ketchen black may be used.

The binder plays a role to bind the active material particles; here, for example, polyvinylidene fluoride (PVDF), polytetrafluoroethylene (PTFE), a fluorine rubber, an ethylene propylene diene rubber, styrene butadiene, a cellulose-based resin, and polyacrylic acid may be used.

As needed, a solvent that can disperse the positive electrode active material, the conductive agent, and an activated carbon, and that can dissolve the binder, is added to the positive electrode mixed material. With regard to the solvent, an organic solvent specifically such as N-methyl-2-pyrrolidone may be used. In addition, in order to increase the electric double layer capacity, an activated carbon may be added to the positive electrode mixed material.

(Negative Electrode)

As the negative electrode, a metal lithium, a lithium alloy, or the like may be used. Alternatively, a shaped article may be used as the negative electrode, the article being prepared in such a way that a negative electrode mixed material, which is prepared by mixing a binder with a negative electrode active material capable of inserting and de-inserting a lithium ion followed by addition of a suitable solvent so as to make it a paste-like form, is applied to the surface of an electric collector made of metal foil such as copper foil, and then, it is dried and, as needed, compressed so as to increase the electrode density.

With regard to the negative electrode active material, for example, natural graphite, artificial graphite, a fired body of an organic compound such as a phenol resin, or a powdery body of a carbon substance such as cokes may be used. In this case, similarly to the positive electrode, among others a fluorine-containing resin such as PVDF may be used as the negative electrode binder; and as the solvent to disperse the active material and the binder, an organic solvent such as N-methyl-2-pyrrolidone may be used.

(Separator)

Between the positive electrode and the negative electrode, a separator is interposed, and then it is disposed. The separator separates between the positive electrode and the negative electrode, and it also stores the electrolyte; for example, a thin film that is made of polyethylene, polypropylene or the like and has many fine pores may be used.

(Nonaqueous Electrolyte Solution)

The nonaqueous electrolyte solution is made by dissolving a lithium salt as a supporting salt in an organic solvent. Illustrative example of the organic solvent includes cyclic carbonates such as ethylene carbonate, propylene carbonate, butylene carbonate, and trifluoropropylene carbonate; linear carbonates such as diethyl carbonate, dimethyl carbonate, ethyl methyl carbonate, and dipropyl carbonate; ether compounds such as tetrahydrofuran, 2-methyl tetrahydrofuran, and dimethoxy ethane; sulfur compounds such as ethyl methyl sulfone and butane sultone; and phosphorous compounds such as triethyl phosphate and trioctyl phosphate; here, a single solvent selected from these solvents or a mixture of two or more of them may be used.

With regard to the supporting salt, $LiPF_6$, $LiBF_4$, $LiClO_4$, $LiAsF_6$, $LiN(CF_3SO_2)_2$, composite salts of them, or the like may be used. Furthermore, the nonaqueous electrolyte solution may include a radical scavenger, a surfactant, a flame retardant, and so forth.

(Form and Composition of the Battery)

The nonaqueous electrolyte secondary battery of the present invention, which as explained above includes the positive electrode, the negative electrode, the separator, and the nonaqueous electrolyte solution, can have various shapes such as a cylindrical shape and a laminate shape. In any shape used, the positive electrode and the negative electrode are laminated via the separator to form an electrode body; then, the electrode body thus obtained is impregnated with the nonaqueous electrolyte solution. Then, between a positive electrode collector and a positive electrode terminal leading to outside, and between a negative electrode collector and a negative electrode terminal leading to outside are connected by a collector lead or the like; and then, they are sealed in a battery case thereby completing the nonaqueous electrolyte secondary battery.

(Characteristics)

The secondary battery according to the present embodiment has a high capacity and an excellent heat stability. The secondary battery using the positive electrode active material 10 that is obtained by a preferable embodiment, for example, a 2032 coin-type battery that is produced with the condition of Examples to be described later, can have a high initial discharging capacity of at least 165 mAh/g; and when the composition and production method thereof are optimized, the secondary battery having a further enhanced capacity can be produced. In addition, for example, when the cycle characteristic is evaluated by using the 2032 coin-type battery that is produced with the condition of Examples to be described later, the ratio of the discharging capacity $D_1$ that is the value after 500 repeats of the charging and discharging operations to the initial discharging capacity $D_0$ ($[D_1/D_0] \times 100$) may be at least 75%, or at least 77% when the condition is further optimized.

EXAMPLES

Hereinafter, the positive electrode active material for a nonaqueous electrolyte secondary battery according to the embodiment of the present invention will be explained in more detail by Examples; however, the present invention is not limited to these Examples.

Example 1

A prescribed amount of purified water was taken into a reaction vessel (50 L); and then, with stirring, the temperature inside the vessel was set at 42° C. At this time, a nitrogen gas was fed into the reaction vessel so as to bring the space inside the reaction vessel to a non-oxidative atmosphere (oxygen concentration: 0.3% by volume). Into this reaction vessel were continuously and simultaneously added a 2.0 mol/L mixed aqueous solution including nickel sulfate, cobalt sulfate, and manganese sulfate with the molar ratio of nickel:cobalt:manganese=45:30:25, an alkaline solution of a 25% by mass aqueous sodium hydroxide solution, and a complexing agent of a 25% by mass aqueous ammonia solution so as to make the aqueous reaction solution thereby carrying out the neutralization crystallization reaction. The flow rates of these solutions were controlled such that the residence time of the metal salts included in the mixed aqueous solution in the reaction vessel might be 8 hours; and the pH value and the ammonium ion concentration were controlled such that the dissolved nickel concentration in the aqueous reaction solution might be 300 mg/L (target value), and whereby the dissolved nickel concentration was stabilized at 319 mg/L. At this time, the ammonium ion concentration in the reaction vessel was controlled in the range of 12 to 15 g/L, whereby the pH value of the solution based on the solution temperature of 25° C. was 12.0 with the fluctuation thereof being ±0.1. After the neutralization crystallization reaction was stabilized in the reaction vessel, the slurry including the nickel-cobalt-manganese composite hydroxide was recovered from the overflow port; and then, a cake of the nickel-cobalt-manganese composite hydroxide was obtained by suction filtration. Impurities included therein were washed out by pouring 1 L of purified water to 140 g of the nickel-cobalt-manganese composite hydroxide in the suction filtration equipment that was used for filtration (washing process). Then, the cake of the nickel-cobalt-manganese composite hydroxide after having been washed was dried at 120° C. to obtain the nickel-cobalt-manganese composite hydroxide, i.e., the precursor to the positive electrode active material (crystallization process).

After the nickel-cobalt-manganese composite hydroxide and lithium carbonate were weighed so as to give the Li/Me ratio of 1.02, they were fully mixed to obtain a lithium mixture by using a shaker mixer (TURBULA Type T2C; manufactured by Willy A. Bachofen AG (WAB)) while applying a strength such that the shape and structure of the precursor were still able to be retained.

The lithium mixture was inserted into a magnesia-made firing vessel, and by using a sealed-type electric furnace, the temperature thereof was raised in an air atmosphere with the flow rate thereof being 10 L/minute and with the temperature raising rate of 2.77° C./minute to 900° C., at which temperature the mixture was kept for 10 hours; and then, it was cooled in the furnace to room temperature to obtain the positive electrode active material formed of the lithium-metal composite oxide (firing process).

The particle size distribution of the positive electrode active material thus obtained was measured by using a laser diffraction scattering particle size analyzer. It was confirmed that the average particle diameter D50 was 7.7 μm, and [(D90-D10)/average particle diameter] was 0.80. The tap density was measured by using a tapping apparatus (KYT 3000; manufactured by Seishin Enterprise Co., Ltd.), and was calculated from the volume and sample weight after the material was tapped for 500 times. As a result, the tap density of 2.2 g/mL was obtained.

Figure 5:
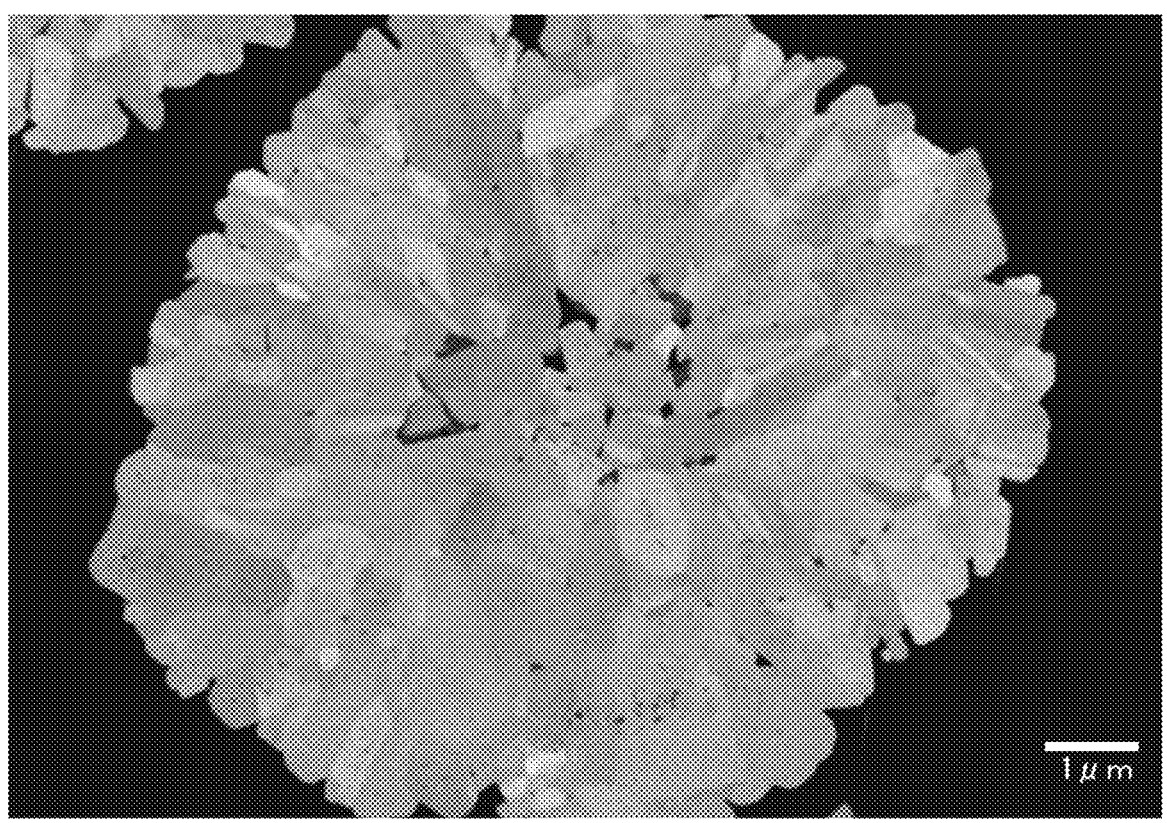
FIG. 5 is a SEM picture of a cross section of the positive electrode active material of Example 1.
Figure 6:
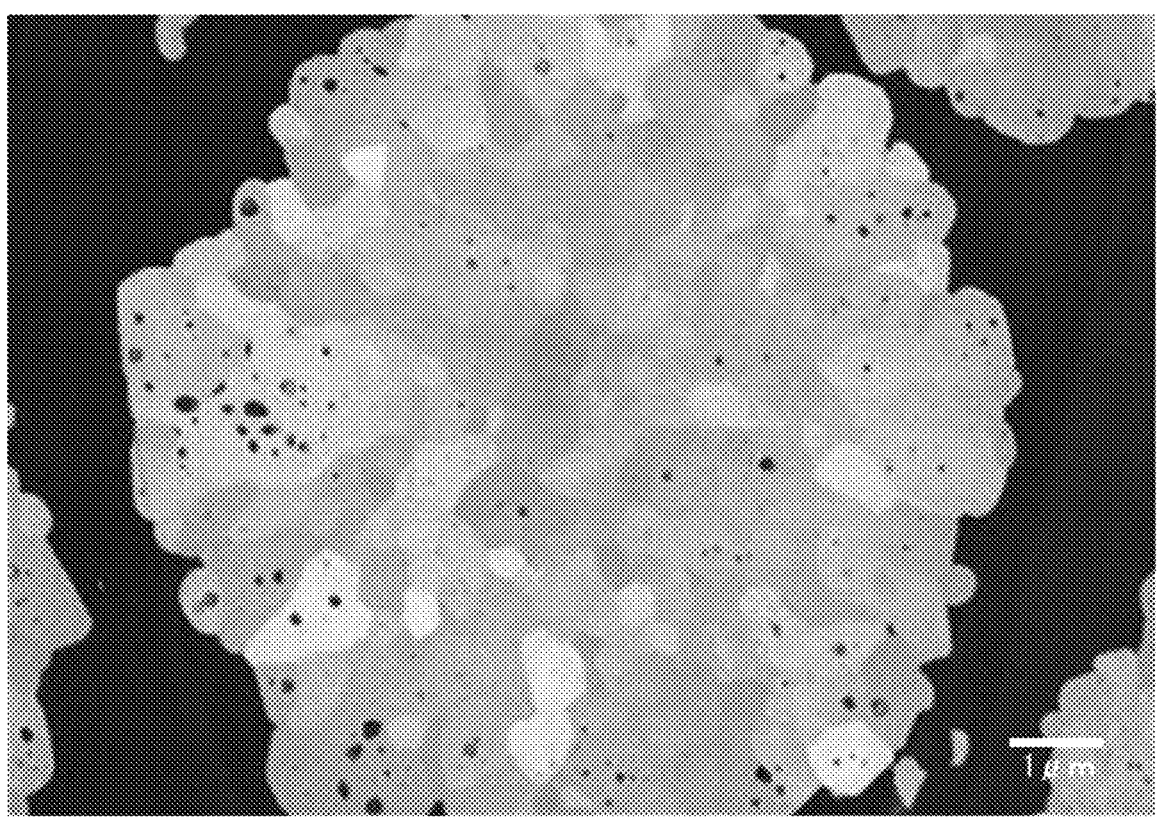
FIG. 6 is a SEM picture of a cross section of the positive electrode active material of Comparative Example 4.

The cross section structure of the obtained positive electrode active material was observed by a scanning electron microscope. In FIG. 5, the cross section structure of the obtained positive electrode active material is displayed. In order to evaluate the void ratio, the particle cross section area of the secondary particle and the void area inside the particle were obtained by using an image analysis software (WinRoof 6.1.1 (trade name); and the respective void ratios of the inner and outer areas of the secondary particle were calculated from the equation [(void area inside the particle)/(particle cross section area)×100] (%). Here, the particle cross section area was obtained as the sum of the void area (black portion) and the cross section of the primary particles (white portions). The center of gravity of the shape formed of the outer circumference of the secondary particle was regarded as the center of the secondary particle, and the shortest distance from the center to an arbitrary point on the outer circumference of the secondary particle was regarded as the radius, and the area from the center to one half of the radius was regarded as the inner area of the secondary particle. Namely, the shape formed of the outer circumference of the secondary particle and the similar shape thereof with the similarity ratio of one half were overlaid while coinciding both of the center of gravity; and inside the similar shape was regarded as the inner area of the secondary particle and the outside the inner area was regarded as the outer area.

The void ratio of the positive electrode active material was calculated by number-averaging the void ratios of each particle of the secondary particles (N=20) that were at least 80% in the volume-average particle diameter (MV). As a result, the void ratio of the inner area (first area) of the secondary particle was 5.2%, and that of the outer area thereof (second area) was 0.1%.

After the obtained positive electrode active material was dissolved by an inorganic acid, the chemical analysis thereof was carried out by an ICP emission spectroscopy to show the composition of $Li_{1.02}Ni_{0.45}Co_{0.30}Mn_{0.25}O_2$; and thus, it was confirmed that the particle having an intended composition was able to be obtained. The production conditions and the characteristics of the obtained positive electrode active material are listed in Table 1.

[Fabrication of the Battery]

Figure 4:
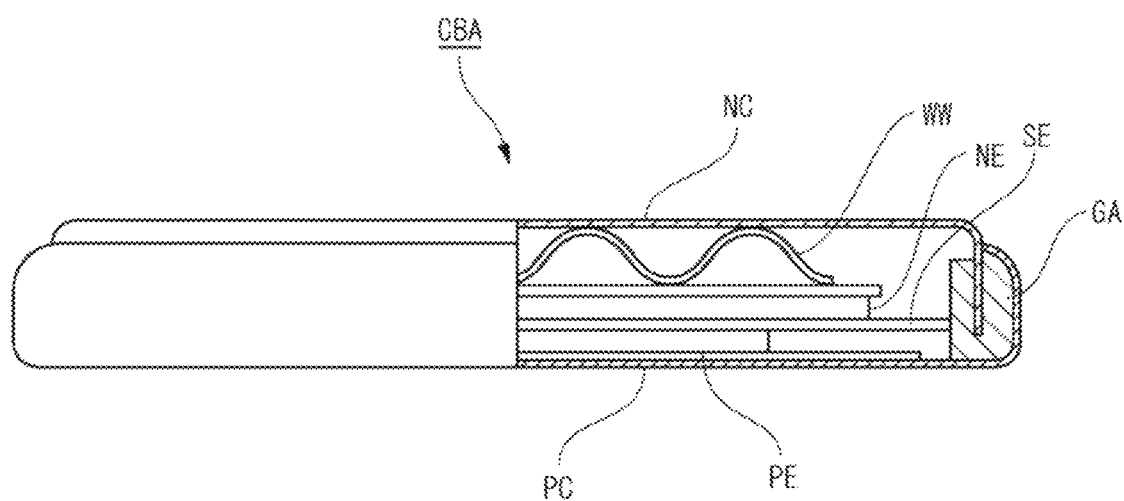
FIG. 4 is a schematic cross-sectional view of a coin-type battery used for evaluation of the battery characteristics.

A mixture of 52.5 mg of the obtained positive electrode active material, 15 mg of acetylene black, and 7.5 mg of polytetrafluoroethylene resin (PTFE) was press molded with the applied pressure of 100 MPa to prepare the positive electrode (electrode for evaluation) PE having the diameter of 11 mm and the thickness of 100 μm, as depicted in FIG. 4. The positive electrode PE thus prepared was dried at 120° C. in a vacuum dryer for 12 hours. Then, the 2032 coin-type battery CBA was prepared by using this positive electrode PE under an Ar atmosphere in a globe box in which the dew point was controlled at −80° C. For the negative electrode NE, a lithium (Li) metal having the diameter of 17 mm and the thickness of 1 mm was used. For the electrolyte solution, an equal amount mixture of ethylene carbonate (EC) and diethyl carbonate (DEC) (manufactured by Tomiyama Pure Chemical Industries, Ltd.) having 1-M $LiClO_4$ as the supporting electrolyte was used. For the separator SE, a polyethylene porous film having the film thickness of 25 μm was used. The coin-type battery having the gasket GA and the wave washer WW was fabricated to the battery having a coin-like shape by using the positive electrode can PC and the negative electrode can NC.

The initial discharging capacity was measured as follows. Namely, after the open circuit voltage (OCV) was stabilized by allowing to leave the coin-type battery for about 24 hours after it was prepared, it was charged to the cut-off voltage of 4.3 V with the current density to the positive electrode being 0.1 $mA/cm^2$, and after 1 hour of pause, it was discharged to the cut-off voltage of 3.0 V, and thereby the capacity at this time was regarded as the initial discharging capacity.

The cycle characteristic was evaluated as follows. Namely, the cycle to charge until 4.1 V and discharge until 3.0 V with the current density to the positive electrode being 2 $mA/cm^2$ was repeated at 60° C. for 500 times with the 2C rate; and the cycle characteristic was obtained by calculating the ratio of the discharging capacity after the repeat of the charging and discharging operations to the initial discharging capacity. Measurement of the charging and discharging capacities was carried out by using a multi-channel voltage/electricity generator (R6741A; manufactured by Advantest Corp.). The measurement results of the initial charging and discharging capacities of the obtained positive electrode active material and the cycle characteristic thereof are listed in Table 1.

Examples 2 to 8

With the same conditions as Example 1 except that the atmospheric oxygen concentration inside the reaction vessel and the dissolved nickel concentration of the aqueous reaction solution at the time of crystallization were changed to those described in Table 1, the positive electrode active material was obtained and the evaluation thereof was carried out. The pH values at the time of adjusting the dissolved nickel concentration were in the range of at least 11.0 and up to 12.3 based on the solution temperature of 25° C. The production conditions and the evaluation results are listed in Table 1.

Comparative Examples 1 to 6

With the same conditions as Example 1 except that the atmospheric oxygen concentration inside the reaction vessel and the dissolved nickel concentration of the aqueous reaction solution at the time of crystallization were changed to those described in Table 1, the positive electrode active material was obtained and the evaluation thereof was carried out. The production conditions and the evaluation results are listed in Table 1.

TABLE 1

| | Lithium-metal composite oxide | | | | Precipitation process | | Positive electrode active material | | | Void ratio | | Battery characteristics | |
|---|---|---|---|---|---|---|---|---|---|---|---|---|---|
| | Metal element composition | | | | Atmospheric oxygen | Dissolved nickel | Average particle | (D90 − D10)/ average particle | Tapped density | Inner area R1 | Outer area R2 | Initial dis- charging capacity | Cycle character- istic |
| | Li/Me ratio a | Ni x | Co y | Mn z | concen- tration (vol %) | concen- tration (mg/L) | diameter MV (µm) | diameter — | (g/cm³) | (%) | (%) | (mAh/g) | (%) |
| Example 1 | 1.02 | 0.45 | 0.3 | 0.25 | 0.3 | 319 | 7.7 | 0.78 | 2.2 | 5.2 | 0.1 | 169 | 77 |
| Example 2 | 1.01 | 0.45 | 0.3 | 0.25 | 0.2 | 723 | 7.6 | 0.81 | 2.4 | 18.9 | 0.1 | 168 | 78 |
| Example 3 | 1.03 | 0.45 | 0.3 | 0.25 | 0.9 | 422 | 8.1 | 0.77 | 2.3 | 5.9 | 0.5 | 169 | 77 |
| Example 4 | 1.03 | 0.45 | 0.3 | 0.25 | 1.8 | 322 | 9.2 | 0.76 | 2.3 | 5.1 | 0.9 | 168 | 77 |
| Example 5 | 1.02 | 0.45 | 0.3 | 0.25 | 1.9 | 796 | 8.9 | 0.77 | 2.2 | 19.6 | 1 | 168 | 79 |
| Example 6 | 1.01 | 0.45 | 0.3 | 0.25 | 1.9 | 398 | 6.3 | 0.76 | 2.1 | 5.5 | 0.9 | 168 | 79 |
| Example 7 | 1 | 0.45 | 0.3 | 0.25 | 1.4 | 772 | 5.5 | 0.73 | 2.1 | 19.2 | 0.7 | 168 | 79 |
| Example 8 | 1.01 | 0.45 | 0.3 | 0.25 | 0.8 | 820 | 8.1 | 0.75 | 2.1 | 22.3 | 0.5 | 166 | 77 |
| Comp. Example 1 | 1.02 | 0.45 | 0.3 | 0.25 | 0.3 | 240 | 7.7 | 0.75 | 2.1 | 3.2 | 0.1 | 164 | 72 |
| Comp. Example 2 | 1.01 | 0.45 | 0.3 | 0.25 | 1.8 | 202 | 8.3 | 0.76 | 2.2 | 2.7 | 0.9 | 164 | 71 |
| Comp. Example 3 | 1.01 | 0.45 | 0.3 | 0.25 | 3.1 | 699 | 8.1 | 0.76 | 2.2 | 17.2 | 1.9 | 161 | 78 |
| Comp. Example 4 | 1.01 | 0.45 | 0.3 | 0.25 | 3.1 | 122 | 7.8 | 0.77 | 2.1 | 1.4 | 1.9 | 160 | 72 |
| Comp. Example 5 | 1.03 | 0.45 | 0.3 | 0.25 | 5.2 | 110 | 7.9 | 0.75 | 2.2 | 1.2 | 4.8 | 157 | 71 |
| Comp. Example 6 | 1.02 | 0.45 | 0.3 | 0.25 | 5.6 | 288 | 7.6 | 0.74 | 2.1 | 3.8 | 5.2 | 159 | 73 |

(Evaluation Results)

In Examples, the void ratios in the inner areas of the secondary particles were at least 5%, and the void ratios in the outer areas thereof were up to 1.5%. In addition, the secondary batteries (for evaluation) obtained by using the positive electrode active materials obtained in Examples had high initial discharging capacity and excellent cycle characteristics. In particular, those having the void ratio of up to 20% in the inner area of the secondary particle acquired high initial discharging capacities of at least 168 mAh/g.

In Comparative Examples 1 and 2, the void ratios in the outer areas of the secondary particles were up to 1.5%, but the void ratios in the inner areas thereof were less than 5%; and thus, sufficient cycle characteristics were not able to be obtained.

In Comparative Example 3, because the void ratio in the inner area of the secondary particle was at least 5%, the cycle characteristic was good; but, because the void ratio in the outer area was more than 1.5%, the initial discharging capacity was low.

In Comparative Examples 4 to 6, the void ratios in the inner areas of the secondary particles were less than 5%, and the void ratios in the outer areas thereof were more than 1.5%; and thus, the initial discharging capacities were low, and sufficient cycle characteristics were not able to be obtained.

As described above, each embodiment and each Example of the present invention are explained in detail; however, a person ordinarily skilled in the art could easily understand that various modifications can be made without substantially deviating from novel items and effects of the present invention. Accordingly, all of these modification examples are considered to be included in the claims of the present invention. In addition, the term used at least once and described with a different but broad or synonymous term in, for example, the specification or the drawings can be replaced with this different term in any portion of the specification or of the drawings. Besides, the composition and action of the positive electrode active material for a nonaqueous electrolyte secondary battery are not limited to those explained in the embodiments and Examples of the present invention; and thus, they can be carried out with various modifications. Furthermore, Japanese Patent Application No. 2016-150621 as well as all the literature cited in this specification are herein incorporated by reference in their entirety to the extent allowed by law.

INDUSTRIAL APPLICABILITY

In the positive electrode active material according to the present embodiment, the void ratio distribution of the secondary particle is controlled, and therefore, the nonaqueous electrolyte secondary battery using this positive electrode active material can have a high initial discharging capacity and an excellent cycle characteristic. Accordingly, the positive electrode active material according to the present embodiment can be suitably used as the positive electrode active material for the nonaqueous electrolyte secondary battery for a vehicle use and for a mobile use.

DESCRIPTION OF REFERENCE SIGNS

10 Positive electrode active material
11 Lithium-metal composite oxide
12 Primary particle
13 Secondary particle
14 Void
d Diameter of secondary particle
r Radius of secondary particle
C Central part
R1 First area
R2 Second area
PE Positive electrode (electrode for evaluation)
NE Negative electrode
SE Separator
GA Gasket
WW Wave washer PC Positive electrode can
NC Negative electrode can

The invention claimed is:

1. A positive electrode active material for a nonaqueous electrolyte secondary battery, the positive electrode active material comprising:
   a lithium-metal composite oxide represented by a general formula: $Li_aNi_xCo_yMn_zM_tO_{2+\alpha}$ (0.95≤a≤1.50, 0.30≤x0.70, 0.10≤y≤0.35, 0.20≤z≤0.40, 0≤t≤0.1, x+y+z+t=1, and 0≤α≤0.5; and M is at least one element selected from Ti, V, Cr, Zr, Nb, Mo, Hf, Ta, Fe, and W) and containing a secondary particle formed of a plurality of flocculated primary particles, wherein
   a void ratio obtained from an image analysis result of a cross section of the secondary particle, the image thereof being obtained by a scanning electron microscope, is at least 5% and up to 22.3% in a first area that is from a central part of the secondary particle to one half of a radius of the secondary particle, and is up to 1.0% in a second area that is outside the first area, and
   a volume-average particle diameter MV is at least 5 μm and up to 20 μm, and [(D90-D10)/average particle diameter] that is an indicator to represent a spread of particle size distribution is at least 0.7.

2. The positive electrode active material for a nonaqueous electrolyte secondary battery according to claim 1, wherein the void ratio in the first area is at least 5% and up to 20%.

3. The positive electrode active material for a nonaqueous electrolyte secondary battery according to claim 1, wherein a tap density thereof is at least 2.0 g/cm³ and up to 2.6 g/cm³.

4. A nonaqueous electrolyte secondary battery, comprising a positive electrode comprising the positive electrode active material for a nonaqueous electrolyte secondary battery according to claim 1.

5. A method for producing a positive electrode active material for a nonaqueous electrolyte secondary battery according to claim 1, comprising:
   a crystallization process of crystallizing a nickel-cobalt-manganese composite hydroxide by neutralizing a salt containing at least nickel, a salt containing at least cobalt, and a salt containing at least manganese in an aqueous reaction solution; and
   a firing process of firing a lithium mixture obtained by mixing the nickel-cobalt-manganese composite hydroxide with a lithium compound in an oxygen atmosphere to obtain a lithium-metal composite oxide, wherein
   in the crystallization process, an oxygen concentration in an atmosphere above a solution surface of the aqueous reaction solution is controlled in a range of at least 0.2% by volume and up to 2% by volume, a temperature of the aqueous reaction solution is controlled in a range of at least 38° C. and up to 45° C., a pH value of the aqueous reaction solution is controlled in a range of at least 11.0 and up to 12.5 based on solution temperature of 25° C., and a dissolved nickel concentration in the aqueous reaction solution is controlled in a range of at least 300 mg/L and up to 900 mg/L.

6. The method for producing a positive electrode active material for a nonaqueous electrolyte secondary battery according to claim 5, wherein the crystallization process includes continuously adding a mixed aqueous solution including nickel, cobalt, and manganese into a reaction vessel, and overflowing slurry including nickel-cobalt-manganese composite hydroxide particles formed by neutralization to recover the particles.

7. The method for producing a positive electrode active material for a nonaqueous electrolyte secondary battery according to claim 6, wherein in the crystallization process, concentration of the mixed aqueous solution ranges from at least 1.5 mol/L and up to 2.5 mol/L.

8. The method for producing a positive electrode active material for a nonaqueous electrolyte secondary battery according to claim 5, wherein in the firing process, firing is carried out at a temperature of at least 800° C. and up to 1000° C.

9. The method for producing a positive electrode active material for a nonaqueous electrolyte secondary battery according to claim 5, wherein in the firing process, lithium hydroxide, lithium carbonate, or a mixture of these is used as the lithium compound.

* * * * *